United States Patent
Poissy (10) Patent No.: US 9,857,256 B2
(45) Date of Patent: Jan. 2, 2018

(54) IN-LINE CONTACTLESS PRESSURE SENSORS AND METHODS OF MEASURING PRESSURE

(75) Inventor: Stephane Poissy, Brunoy (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/989,261

(22) PCT Filed: Nov. 22, 2011

(86) PCT No.: PCT/US2011/061748
§ 371 (c)(1),
(2), (4) Date: May 23, 2013

(87) PCT Pub. No.: WO2012/074824
PCT Pub. Date: Jun. 7, 2012

(65) Prior Publication Data
US 2013/0247675 A1    Sep. 26, 2013

(30) Foreign Application Priority Data

Nov. 29, 2010 (EP) .................................... 10306312

(51) Int. Cl.
*G01L 7/08* (2006.01)
*G01L 19/06* (2006.01)
(Continued)

(52) U.S. Cl.
CPC ............... *G01L 7/08* (2013.01); *G01F 1/383* (2013.01); *G01L 9/0002* (2013.01);
(Continued)

(58) Field of Classification Search
CPC ..................... G01L 9/0026; G01L 19/0023
See application file for complete search history.

(56) References Cited

U.S. PATENT DOCUMENTS

| | | | |
|---|---|---|---|
| 2,320,902 A | 7/1940 | Williams | |
| 2,877,799 A * | 3/1959 | Hildenbrandt, Jr. | .... G01L 7/022 138/26 |

(Continued)

FOREIGN PATENT DOCUMENTS

| | | | | |
|---|---|---|---|---|
| GB | 2019007 A | 10/1979 | | |
| JP | WO 2010137392 A1 * | 12/2010 | ............... | G01F 1/38 |

(Continued)

OTHER PUBLICATIONS

International Searching Authority; International Search Report; dated Mar. 21, 2012; pp. 1-2.
(Continued)

*Primary Examiner* — R. A. Smith
*Assistant Examiner* — Herbert K Roberts
(74) *Attorney, Agent, or Firm* — Gregory V. Bean (57) ABSTRACT

A pressure sensor includes a housing that includes an interior surface and an axially symmetric liner disposed along the interior surface of the housing, where the liner includes an interior surface and an exterior surface. The pressure sensor further includes a sensing member that includes an interior surface and an exterior surface, where the interior surface of the sensing member is adjacent to the exterior surface of the liner, and the sensing member is configured to expand with the liner. The pressure sensor further includes a strain gauge affixed to the exterior surface of the sensing member.

20 Claims, 9 Drawing Sheets

(51) Int. Cl.
  *G01F 1/38* (2006.01)
  *G01L 19/00* (2006.01)
  *G01L 9/00* (2006.01)

(52) U.S. Cl.
  CPC ........ *G01L 19/0023* (2013.01); *G01L 9/0026* (2013.01); *G01L 19/0038* (2013.01); *G01L 19/0618* (2013.01); *G01L 19/0627* (2013.01)

(56) References Cited

U.S. PATENT DOCUMENTS

| | | | |
|---|---|---|---|
| 4,412,454 A | 11/1983 | Yamashita et al. | |
| 4,735,229 A * | 4/1988 | Lancaster | E21B 34/02 137/312 |
| 4,775,816 A | 10/1988 | White et al. | |
| 5,115,676 A | 5/1992 | Lee | |
| 5,154,083 A * | 10/1992 | Bernstein | G01L 7/02 29/447 |
| 5,672,832 A * | 9/1997 | Cucci et al. | 73/861.52 |
| 5,874,680 A | 2/1999 | Moore | |
| 6,041,659 A * | 3/2000 | Wilda | G01L 19/0038 73/720 |
| 6,450,037 B1 | 9/2002 | McGuinn et al. | 73/705 |
| 6,540,037 B2 | 4/2003 | Sasano et al. | |
| 6,550,338 B1 * | 4/2003 | Rashidi | 73/715 |
| 6,655,216 B1 | 12/2003 | Aizawa | |
| 6,684,708 B2 | 2/2004 | Weigl | |
| 6,820,632 B2 | 11/2004 | Ohmi et al. | |
| 7,152,479 B2 | 12/2006 | Krause et al. | |
| 7,434,473 B1 * | 10/2008 | Allen | G01L 9/0002 73/720 |
| 2001/0034064 A1 | 10/2001 | Turner et al. | 436/34 |
| 2002/0045265 A1 | 4/2002 | Bergh et al. | 436/37 |
| 2003/0156995 A1 | 8/2003 | Gilligan et al. | 422/100 |
| 2004/0208806 A1 | 10/2004 | Ashe et al. | 422/200 |
| 2004/0255645 A1 | 12/2004 | Imai | |
| 2005/0120799 A1 * | 6/2005 | Gysling | G01L 19/0023 73/753 |
| 2005/0160828 A1 * | 7/2005 | Hasunuma | G01L 19/0023 73/715 |
| 2005/0204822 A1 * | 9/2005 | Schumacher | G01F 1/383 73/718 |
| 2005/0235755 A1 | 10/2005 | Hindman | 73/756 |
| 2006/0037408 A1 * | 2/2006 | Peter | G01F 1/363 73/861.63 |
| 2006/0144151 A1 | 7/2006 | Krause et al. | |
| 2006/0230837 A1 * | 10/2006 | Wilson | 73/736 |
| 2007/0168150 A1 * | 7/2007 | Hirata | G01F 1/6842 702/130 |
| 2009/0162265 A1 | 6/2009 | Poissy et al. | |
| 2009/0297410 A1 | 12/2009 | Lobet et al. | |
| 2010/0081577 A1 | 4/2010 | Sidhu et al. | 506/7 |
| 2012/0045377 A1 | 2/2012 | Gremetz et al. | |

FOREIGN PATENT DOCUMENTS

| | | | |
|---|---|---|---|
| WO | 01/01099 | 1/2001 | |
| WO | WO 0101099 A1 * | 1/2001 | G01L 9/0027 |
| WO | 2010137392 A1 | 12/2010 | |
| WO | WO 2010137392 A1 * | 12/2010 | |

OTHER PUBLICATIONS

CN201180057255.6 Search Report.
European Search Report EP10306312.9 dated Mar. 31, 2011, European Patent Office.

* cited by examiner

IN-LINE CONTACTLESS PRESSURE SENSORS AND METHODS OF MEASURING PRESSURE

This application claims the benefit of priority under 35 USC §119 of European Patent Application Serial No. 10306312.9 filed on Nov. 29, 2010 the content of which is relied upon and incorporated herein by reference in its entirety.

FIELD

The present invention is generally directed to devices and methods for measuring pressure.

BACKGROUND

Flow reactors allow for the processing of chemical compounds with a high degree of control of reaction parameters. As the volume of chemical compounds being processed increases, there is a need to add reactors working in parallel and split a single product line into multiple sub-feeding lines supplying each reactor. To balance the amount of reactant chemicals that flow through each reactor, the flow rate of the reactant chemicals needs to be monitored. Additionally, for flow reactors processing stoichiometric reactions, the flow rate of the reactant chemicals needs to be matched to ensure a complete reaction of the reactants.

The materials from which pressure sensors are constructed may be reactive with the chemicals that are being processed in the reactor. Additionally, pressure sensors may contain entrapped volumes along the fluid flow path that prevent the pressure sensor from being easily cleaned when production of a particular chemical product is complete. Accordingly, there is a need for improved pressure sensors and methods of measuring pressure.

SUMMARY

In one embodiment, a pressure sensor includes a housing that includes an interior surface and an axially symmetric liner disposed along the interior surface of the housing, where the liner includes an interior surface and an exterior surface. The pressure sensor further includes a sensing member that includes an interior surface and an exterior surface, where the interior surface of the sensing member is adjacent to the exterior surface of the liner, and the sensing member is configured to expand with the liner. The pressure sensor further includes a strain gauge affixed to the exterior surface of the sensing member.

In another embodiment, a method of measuring a pressure of a fluid includes passing the fluid through a pressure sensor. The pressure sensor includes a housing that includes an interior surface, and an axially symmetric liner disposed along the interior surface of the housing, where the liner includes an interior surface and an exterior surface. The pressure sensor further includes a sensing member that includes an interior surface and an exterior surface, where the interior surface of the sensing member is adjacent to the exterior surface of the liner, and the sensing member is configured to expand with the liner, and a strain gauge affixed to the exterior surface of the sensing member. The method further includes evaluating an expansion of the sensing member based on an extension of the strain gauge, and calculating the magnitude of the pressure of the fluid inside the liner based on the extension of the strain gauge.

In another embodiment, a fluid flow meter includes a housing that includes an interior surface, and an axially symmetric liner disposed along the interior of the housing, where the liner includes an interior surface, an exterior surface, and an orifice, where the orifice is defined by a smallest internal diameter of the liner along a path of fluid flow. The fluid flow meter further includes an upstream sensing member that includes an interior surface and an exterior surface, where the interior surface of the upstream sensing member is adjacent to the exterior surface of the liner and the upstream sensing member is located on an upstream side of the orifice, a downstream sensing member that includes an interior surface and an exterior surface, where the interior surface of the downstream sensing member is adjacent to the exterior surface of the liner and the downstream sensing member is located on a downstream side of the orifice, an upstream strain gauge affixed to the exterior surface of the upstream sensing member, and a downstream strain gauge affixed to the exterior surface of the downstream sensing member.

In another embodiment, a reactor system is provided. The reactor system comprises a plurality of microreactors, and a pressure sensor coupled to at least one of the plurality of microreactors. The pressure sensor includes a housing comprising an interior surface, an axially symmetric liner disposed along the interior surface of the housing, where the liner includes an interior surface and an exterior surface. The pressure sensor further includes a sensing member that includes an interior surface and an exterior surface, where the interior surface of the sensing member is adjacent to the exterior surface of the liner, and the sensing member is configured to expand with the liner, and a strain gauge affixed to the exterior surface of the sensing member.

BRIEF DESCRIPTION OF THE DRAWINGS

The following detailed description of specific embodiments of the present invention can be best understood when read in conjunction with the drawings enclosed herewith.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

Embodiments of the present invention are directed to a pressure sensor wherein, the pressure sensor includes a housing and an axially symmetric liner that runs along an interior surface of the housing. A sensing member is adjacent to the liner and is configured to expand with the liner. A strain gauge is affixed to the exterior surface of the sensing member. When a fluid is introduced to the pressure sensor through the liner, the pressure of the fluid causes the liner to expand, which, in turn, causes the sensing member to expand. The strain gauge measures the expansion of the sensing member and the measurement of strain in the sensing member allows the pressure of the fluid inside the liner to be calculated.

Figure 1:
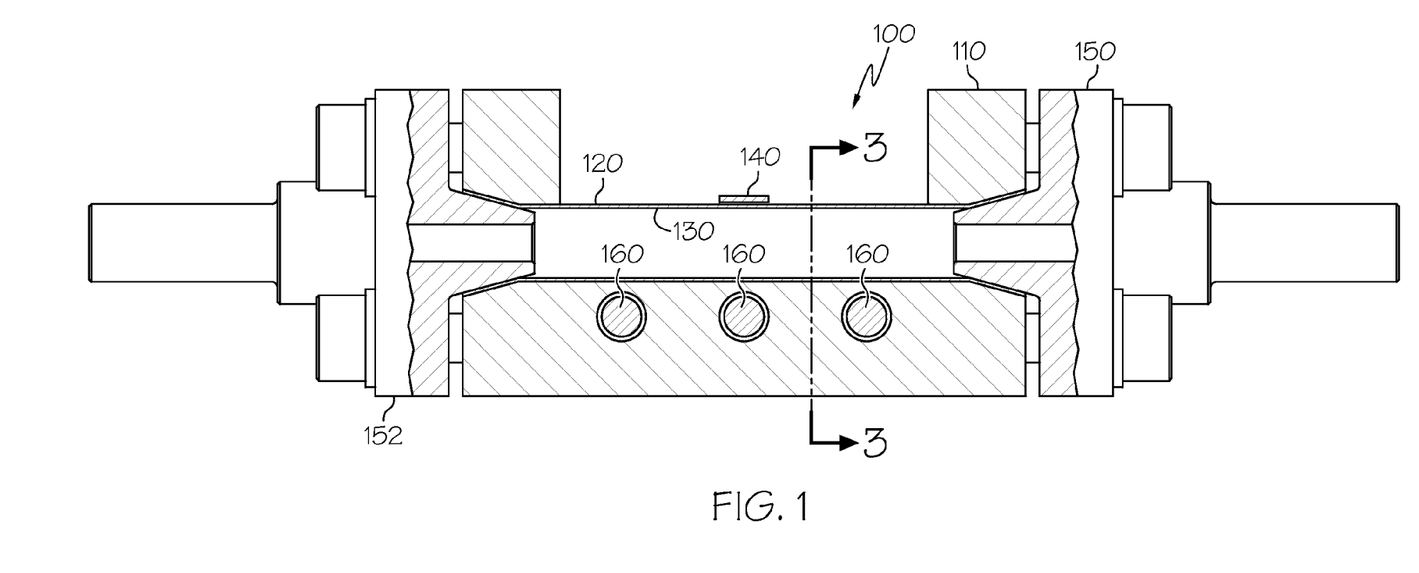
FIG. 1 depicts a section view of an in-line pressure sensor according to one or more embodiments shown and described herein.
Figure 2:
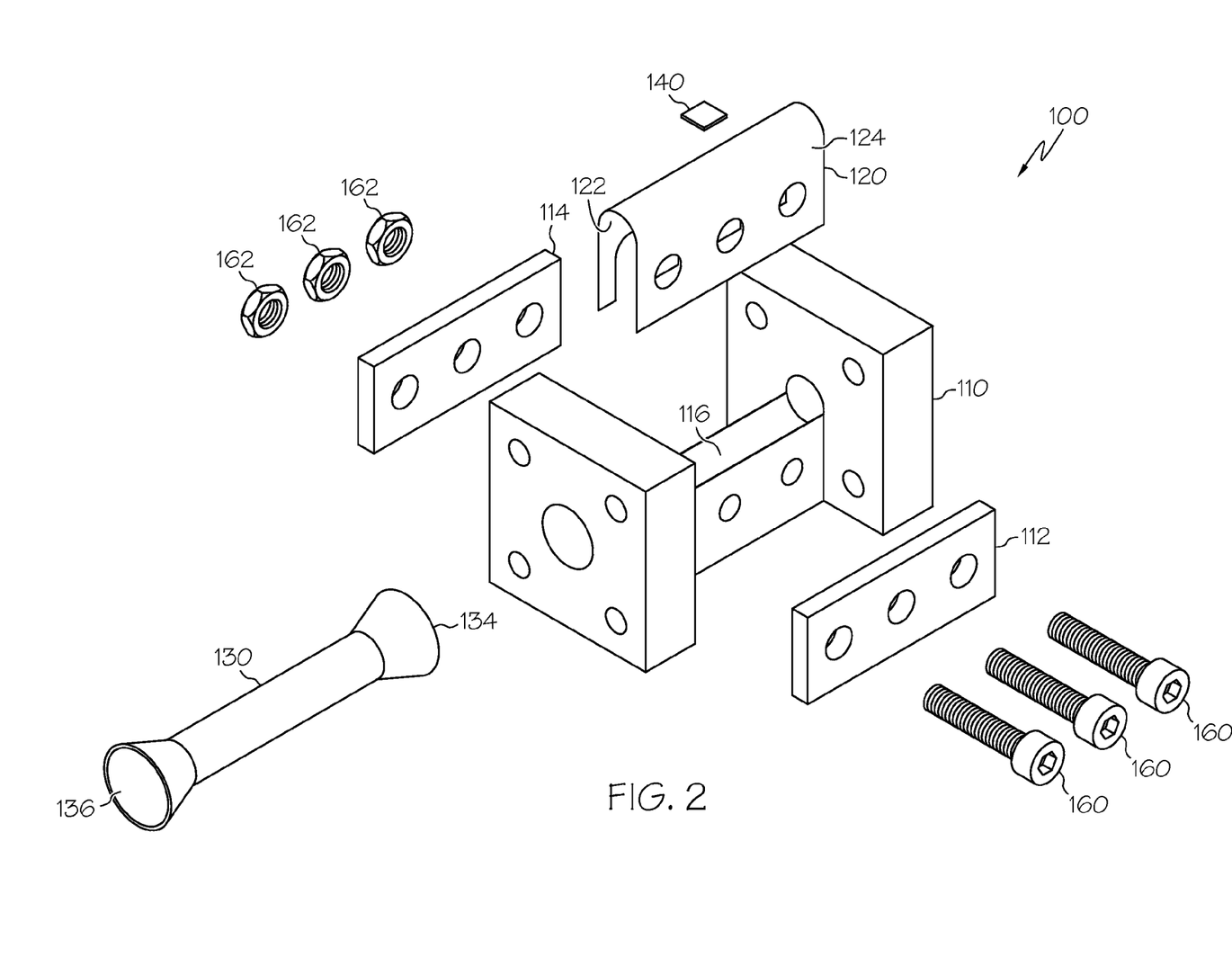
FIG. 2 depicts an exploded perspective view of the in-line pressure sensor of FIG. 1.
Figure 3:
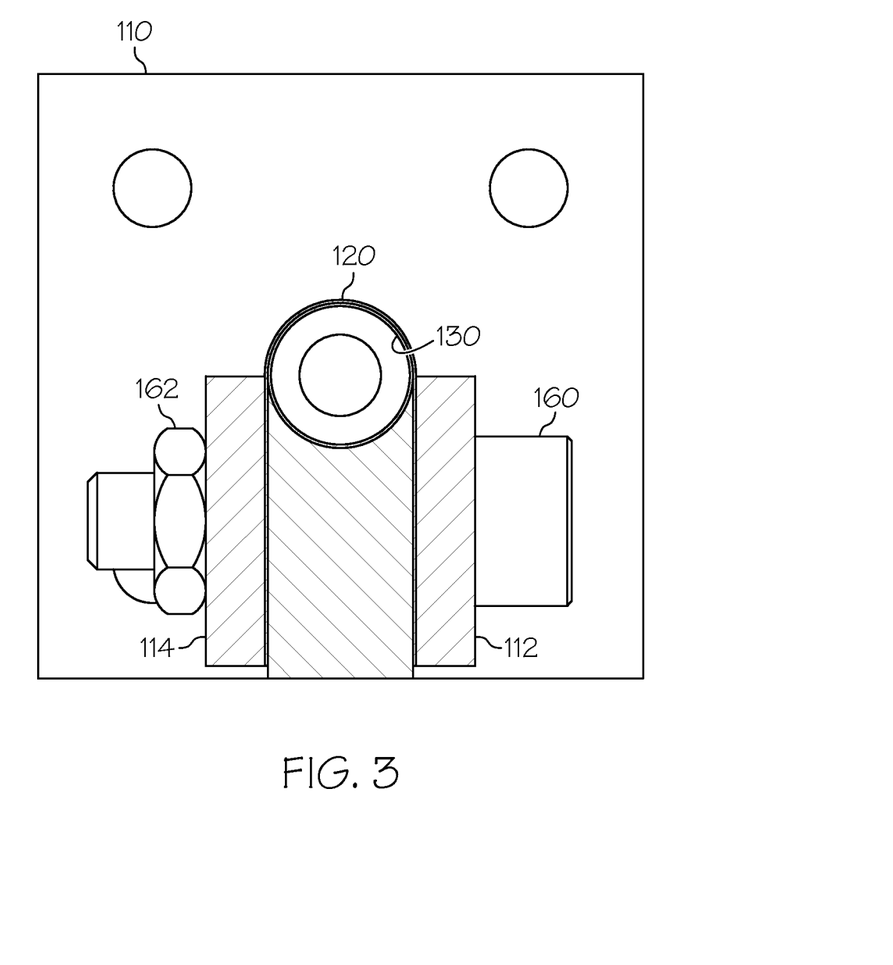
FIG. 3 depicts a section view of the in-line pressure sensor of FIG. 1.

Referring to FIGS. 1-3, the in-line contactless pressure sensor 100 includes a housing 110 that has an interior surface 116 and an axially symmetric liner 130 that has an interior surface 136 and an exterior surface 134 and is located along the interior surface 116 of the housing 110. The pressure sensor 100 further includes a sensing member 120 comprising an interior surface 122 and an exterior surface 124. The sensing member 120 is located relative to the housing 110 such that the interior surface 122 of the sensing member 120 is adjacent to the exterior surface 134 of the liner 130. A strain gauge 140 is affixed to the exterior surface 124 of the sensing member 120. The sensing member 120 is configured to expand and contract with the liner 130 as the pressure of a fluid inside the liner 130 changes. The inlet and the outlet of the pressure sensor 100 are connected with an inlet line 150 and an outlet line 152, respectively, so that a fluid can be introduced to the pressure sensor 100. A variety of applications of using the pressure sensor 100 are envisioned, for example, the pressure sensor 100 can be used with a flow reactor, for example, a microreactor, to measure the pressure of the chemical fluid that is entering the flow reactor.

The liner 130 is made of a chemically inert material so that chemicals that pass through the pressure sensor 100 do not react with the surfaces along the flow path. Examples of such chemically inert materials include polymers-based materials, for example fluoropolymers, which include polytetrafluoroethylene (PTFE), fluorinated ethylene propylene (FEP), and perfluoroalkoxy (PFA). Other chemically inert materials that are not polymer-based materials may be suitable for fabricating the liner 130, including silicon. The choice of material from which to fabricate the liner 130 will vary depending on which chemicals will be introduced to the pressure sensor 100. Additionally, the inlet line 150 and the outlet line 152 are made from a chemically inert material so that chemicals do not react with these components when entering or leaving the pressure sensor 100. The use of chemically inert materials for the liner 130 allow the pressure sensor 100 to withstand chemical attack due to concentrated bases or acids at a pressure exceeding about 100 bar and temperature exceeding about 200° C.

The liner 130 prevents chemicals from coming into contact with the materials from which other components of the pressure sensor 100 are constructed, for example, the housing 110 and the sensing member 120. These components may be fabricated from a variety of materials, including a variety of metals, including ferrous and non-ferrous alloys, for example, carbon steel, stainless steel, nickel, aluminum, titanium, and alloys containing these metals. Some of these materials may react with a particular chemical reactant that is introduced to the pressure sensor 100 in fluid form, which is undesirable for maintaining a controlled chemical reaction. As stated above, this undesirable effect is prevented by the chemically inert liner 130.

Additionally, the liner 130 has an axially symmetric shape, meaning that the cross-section of the liner 130 has a uniform shape as evaluated around the centerline axis of the liner 130. Because the liner 130 has an axially symmetric shape, there are no locations where the liner 130 extends in a direction perpendicular to the centerline axis of the liner 130. This axially symmetric shape reduces the amount of "dead volume" inside the liner 130, or areas along the interior of the liner 130 where fluids become trapped. Additionally, the conical ends of the liner 130 form a seal with the conical ends of the inlet line 150 and the outlet line 152. By using fluid connectors that have these shapes, the need for an additional seal feature, and therefore another potential dead volume, is eliminated. Dead volumes along the path of flow would make it difficult to clean reactant chemicals from the interior of the pressure sensor. Pressure sensors 100 that include axially symmetric liners 130 allow reactant chemicals to be cleaned from the interior through flushing. Reducing the difficulty of cleaning reduced the downtime of the reaction equipment, and reduces the likelihood of contamination in a subsequent chemical reaction.

The requirement of cleanliness in chemical processing equipment is highlighted by the current Good Manufacturing Practices (cGMP), which are used by manufacturers and regulating agencies to ensure quality in food and pharmaceutical products manufacturing processes. In the United States, the Food and Drug Administration (FDA) regulates the production of food and pharmaceutical products according to the cGMP promulgated in relevant parts of Chapter 21 of the Code of Federal Regulations. Failure to remove unwanted chemicals may generate pollution or may cause an undesirable reaction when other chemicals are introduced to the pressure sensor 100.

The sensing member 120 is configured to expand and contract with the liner 130 as the pressure of the fluid inside the liner 130 increases and decreases, respectively. The sensing member 120, as depicted in FIGS. 1-3, is a curved metal sheet that partially surrounds the exterior surface 124 of the liner 130. In this embodiment, the sensing member 120 is coupled to the housing 110 such that the interior surface 122 of the sensing member 120 and the interior surface of the housing 110 form an enclosed channel that surrounds the liner 130. When the pressure of the fluid inside the liner 130 increases, the liner 130 is deflected in an outward direction. Because the wall thickness of the liner 130 is thin, for example, as thin as about 0.025 millimeters, and made of a polymer-based material, the liner 130 is flexible to expand in the circumferential direction. Therefore, when the fluid pressure rises, the liner 130 expands in an outward direction until the exterior surface 134 of the liner 130 contacts the interior surface 122 of the sensing member 120. With increasing pressure of the fluid inside the liner 130, the liner 130 and the sensing member 120 expand with one another to resist this pressure.

In the embodiment depicted in FIGS. 1-3, the sensing member 120 is secured to the housing 110 by a plurality of fasteners 160, 162, which secure the flat portions of the sensing member 120 with opposing securing blocks 112, 114. Because the sensing member 120 is secured to the housing 110, and the interior surface 116 of the housing 110 resists deformation, an increase in pressure of a fluid inside the liner 130 will cause the liner 130 to expand. Because the exterior surface 134 of the liner 130 contacts the interior surface 122 of the sensing member 120, this increase in pressure will cause the sensing member 120 to expand, thereby exerting a force on the sensing member 120, which causes strain in the sensing member 120. This strain in the sensing member 120 is measured by the strain gauge 140.

Because the sensing member 120 and the interior surface 116 of the housing 110 provide mechanical support to the liner 130 against the pressure of the fluid passing through the pressure sensor 100, the liner 130 may be constructed of a thin, chemically inert material. In one embodiment, the liner 130 may be constructed of a PTFE tube having a wall thickness of approximately 0.025 millimeter. As another aspect, in this and all other embodiments herein in which the liner has sufficient mechanical support, the liner may also optionally take the form of a sprayed-on or dip-coated liner, rather than an originally self-supporting sleeve.

The strain gauge 140 affixed to the exterior surface 124 of the sensing member 120 is configured to evaluate the strain that the sensing member 120 experiences with increasing pressure of the fluid inside the liner 130. The strain gauge 140 is arranged to evaluate the strain of the sensing member 120 in at least the circumferential direction of the liner 130. Measuring the strain of the sensing member 120 in this direction gives a measurement of the static pressure of the chemical fluid inside the liner 130.

Additional strain gauges may be affixed to the sensing member 120, for example, to reduce any effect that temperature would have on the strain measurement, or to increase the accuracy and/or reliability of the strain measurement. For example, a strain gauge placed on the sensing member 120 in a direction parallel to the axial direction of the liner 130 would not be expected to have a reading of strain because the sensing member 120 is not constrained in this axial direction. Instead, a strain gauge placed in this direction can be used to calculate the change in size of the sensing member 120 due to thermal expansion. Such a measurement may be used in conjunction with a strain gauge 140 measuring in a circumferential direction to correct the circumferential strain measurement for temperature effects.

The strain gauge 140 is electronically connected with a sensing instrument, for example a data acquisition system that includes a computer that is able to determine the strain measured by the strain gauge 140. The sensing instrument may continuously monitor the strain gauge 140 so that the pressure of the fluid inside the liner 130 is always known.

In embodiments measuring the change in resistance of the strain gauge 140, the strain gauge 140 is electronically connected with a sensing instrument that evaluates the change in resistance of the strain gauge 140 and calculates the corresponding strain. In embodiments measuring the change in voltage across corresponding strain gauges 140 (i.e., Wheatstone bridge arrangements), the strain gauges 140 are electronically connected with a sensing instrument that evaluates the change in voltage across corresponding strain gauges 140 and calculates the corresponding strain. In a Wheatstone bridge arrangement, a current is applied across a set of strain gauges 140 that are particularly arranged and connected into a circuit. When there is no strain applied to the strain gauges 140, the resistances of the strain gauges 140 are balanced and there is no voltage differential across the connected strain gauges 140. However, when the strain gauges 140 are stretched or compressed, the resistance of the strain gauges 140 changes such that the resistances across the circuit become unbalanced, which causes a voltage differential across the connected strain gauges 140. Measuring this voltage differential may be easier than measuring the change in resistance of a strain gauge 140.

The pressure sensor 100 is calibrated so that the strain measured at the sensing member 120 is correlated with a magnitude of a pressure of a fluid inside the liner 130. The sensing member 120 may be manufactured to strict tolerances such that the calculation of pressure is consistent and repeatable across multiple sensing members 120. Alternatively, each pressure sensor 100 may be calibrated and given a calibration constant that relates the strain measured at the sensing member 120 with the pressure inside the pressure sensor 100.

The pressure sensor 100 may be used in a variety of applications, for example to measure the pressure of a fluid that is entering a microreactor. A microreactor is a device that includes a plurality of microfluidic channels inside of which chemical reactions take place. Chemical reactants in fluid form are introduced to the microfluidic channels. As the chemical reactants intermingle with one another, the chemicals undergo chemical reactions to end with products of the reaction. Processing chemicals in such a microreactor is described as a continuous flow process. As more products of the reaction are required, the duration of the process is increased. However, the maximum amount of chemical products that are produced from a single microreactor is generally a fixed quantity for a given period of time. Thus, to increase the amount of chemical products produced by a continuous flow process, multiple microreactors are banked together and the chemical reactants are introduced into each of the microreactors. To ensure an even split of chemicals across the bank of microreactors, the pressure of the inlet lines containing fluid chemical reactants are monitored and balanced to approximately the same pressure. By controlling the inlet pressure to be consistent to each of the microreactors in the bank, an even flow of chemical reactants flow to each microreactor, and even chemical reactions take place across each of the microreactors.

Figure 4:
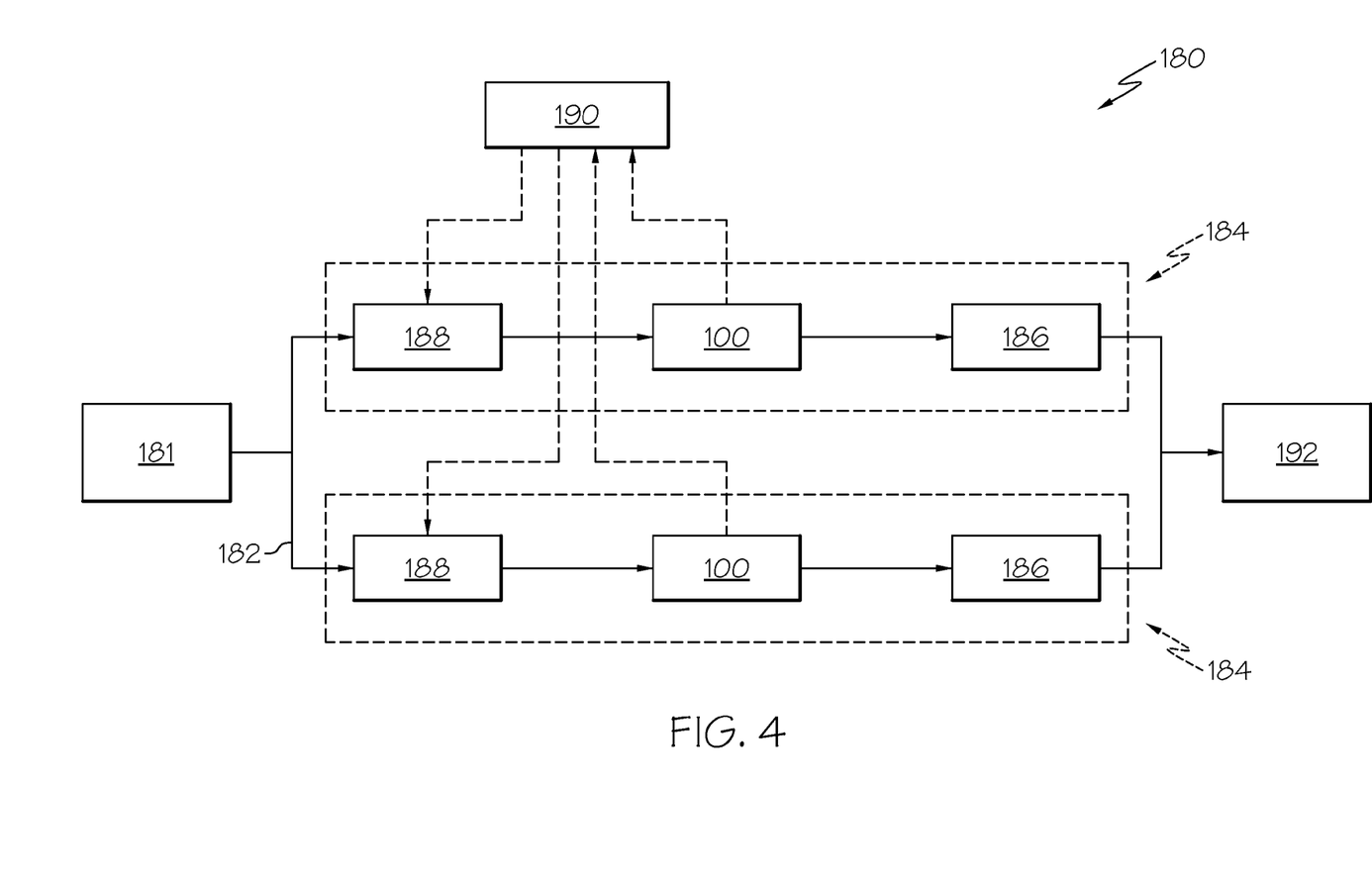
FIG. 4 depicts a schematic representation of a flow reactor according to one or more embodiments shown and described herein.

A schematic of a layout of a flow reactor 180 is depicted in FIG. 4. Chemical reactants 181 are directed through conduits 182 into one of two banks 184 of microreactors 186. Control valves 188 determine the amount of chemical reactant 181 that will flow through the bank 184. The pressure of the chemical reactants 181 is measured by the pressure sensors 100 prior to the chemical reactants 181 flowing into the microreactors 186. The chemical reactants 181 mix and react inside the microreactors 186 to form chemical reaction products 192, which are collected after exiting the banks 184. As depicted in FIG. 4, the pressure sensors 100 are electronically connected with a computer 190, which is also electronically connected with the control valves 188. The computer 190 commands the control valves 188 to open or close as necessary to balance the pressure of the chemical reactants 181 entering the microreactors 186.

Figure 5:
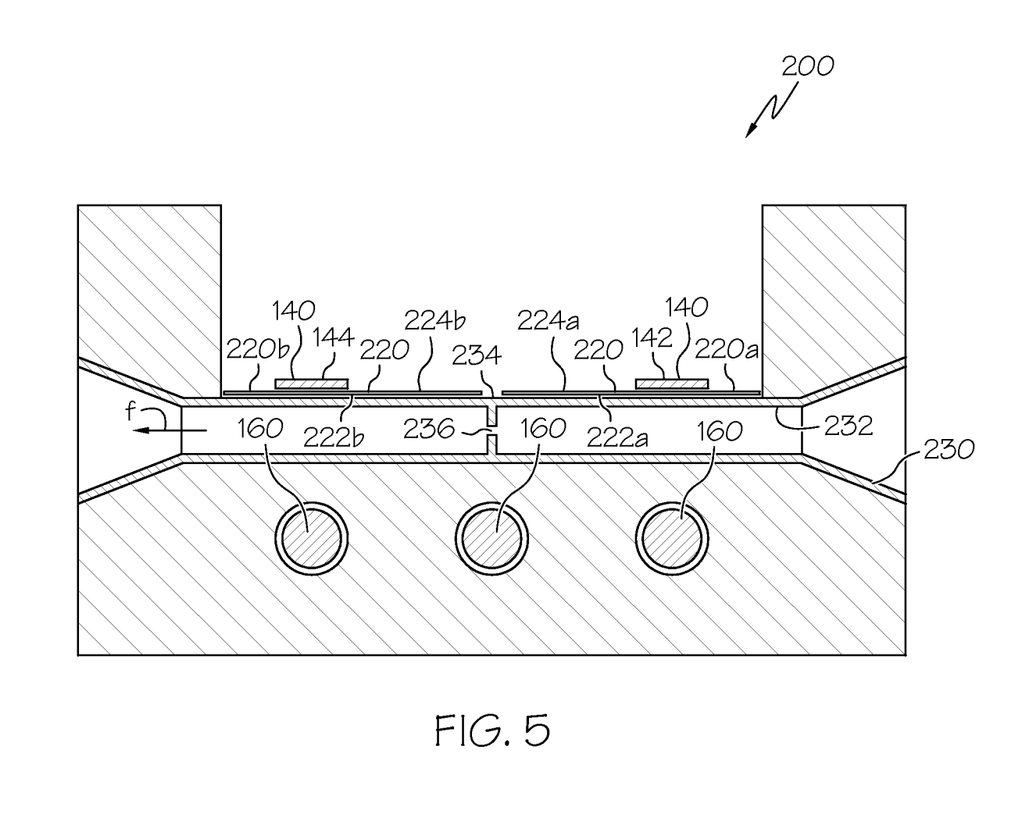
FIG. 5 depicts a section view of an in-line pressure sensor according to one or more embodiments shown and described herein.

Another embodiment of the pressure sensor 200 is depicted in FIG. 5, where the pressure sensor 200 acts as a fluid flow meter, measuring the rate of the fluid passing through the liner 230 by measuring the static pressure of the fluid at two points. Fluid passes through the liner 230 in the direction of fluid flow f along the path of fluid flow through the interior surface 232 of the liner 230. The smallest internal diameter of the liner 230 along the path of fluid flow is defined as an orifice 236. The pressure sensor 200 includes two sensing members 220, an upstream sensing member 220*a*, and a downstream sensing member 220*b*. The downstream sensing member 220*b* and the upstream sensing member 220*a* are spaced apart from one another, and the downstream sensing member 220*b* is spaced downstream (along the direction of fluid flow f) from the orifice 236, while the upstream sensing member 220*a* is spaced upstream from the orifice 236. The upstream sensing member 220*a* includes an interior surface 222*a* and an exterior surface 224*a*. The downstream sensing member 220*b* includes an interior surface 222*b* and an exterior surface 224*b*. The interior surface 222*a* of the upstream sensing member 220*a* and the interior surface 222*b* of the downstream sensing member 220*b* are both adjacent to the exterior surface 234 of the liner 230. The pressure sensor 200 additionally includes two strain gauges 140, an upstream strain gauge 142 that is affixed to the exterior surface 224*a* of the upstream sensing member 220*a* and a downstream strain gauge 144 that is affixed to the exterior surface 224*b* of the downstream sensing member 220*b*.

The upstream sensing member 220*a* and the downstream sensing member 220B each are provided with a strain gauge 142, 144 to measure the pressure of the fluid inside the liner 230 at a location along the path of fluid flow. By measuring the strain at a location upstream of the orifice 236 and at a location downstream of the orifice 236, and knowing the size of the orifice 236, the pressure sensor 200 can be used to calculate and monitor the flow rate of the fluid passing through the liner 230.

The orifice 236 may be a square-edged orifice, as depicted in FIG. 5. The orifice 236 may also be a sharp-edged orifice, or any other suitable shape. A square-edged orifice and a sharp-edged orifice are each associated with a discharge coefficient that can be used, along with the upstream and the downstream pressures and the size of the orifice 236, to calculate the rate of fluid flow through the liner 230.

A measurement of the flow rate of the fluid passing through the pressure sensor 200 may be required for certain applications where the absolute flow rate of the fluid is required. For example, when using a microreactor to produce a stoichiometric reaction, the absolute flow rates of the reactant chemicals being introduced to the microreactor is needed. By controlling the absolute flow rates of the fluids, an even proportion of reactant chemicals can be introduced to the microreactor to allow the reactants to completely react with one another.

Figure 6:
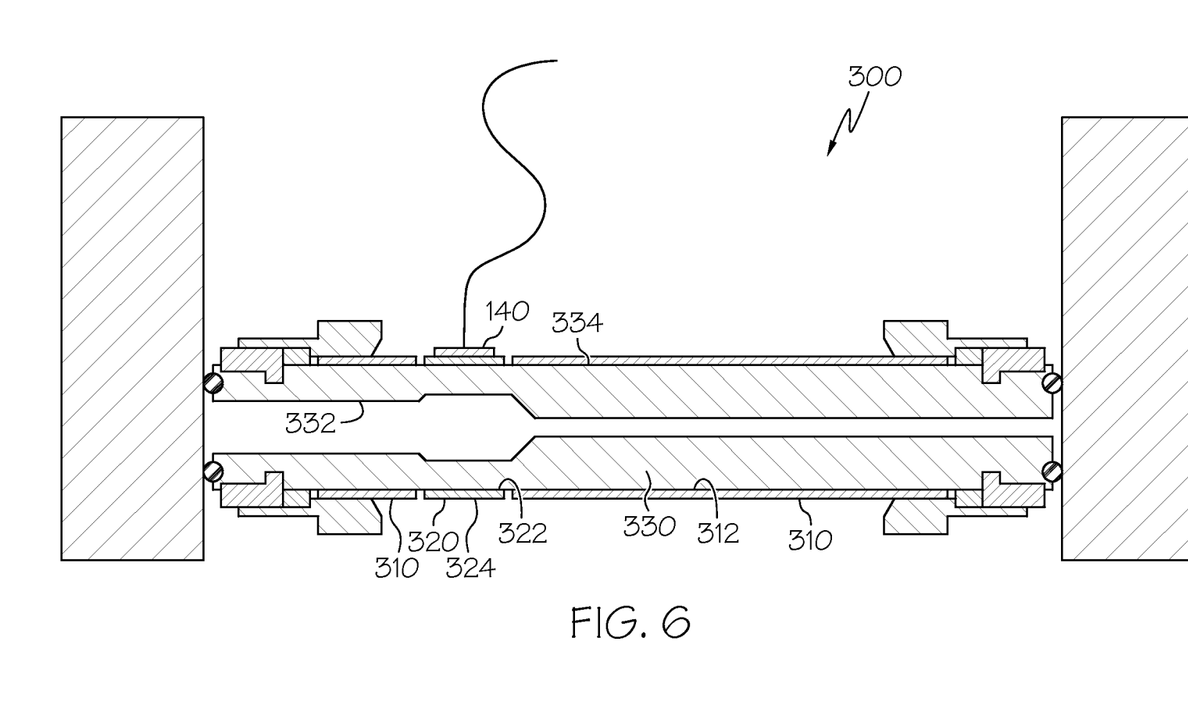
FIG. 6 depicts a section view of an in-line pressure sensor according to one or more embodiments shown and described herein.
Figure 7:
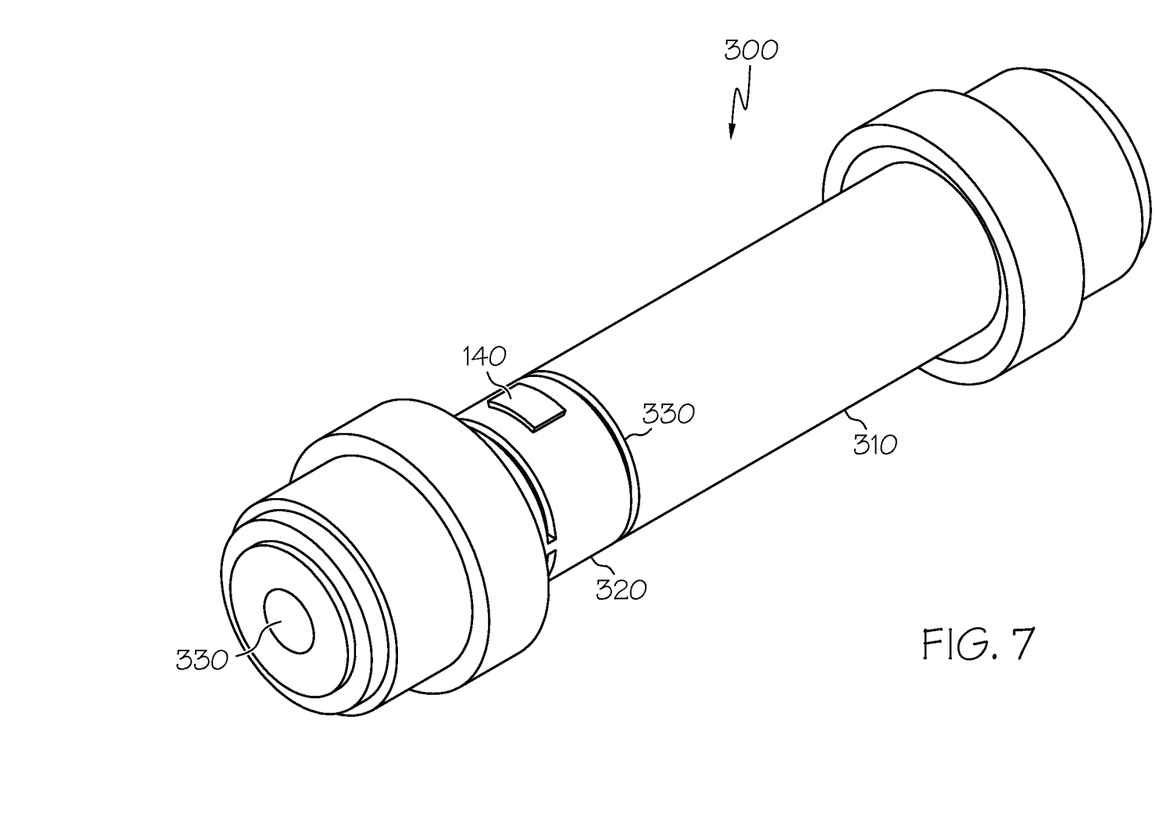
FIG. 7 depicts a perspective view of the in-line pressure sensor of FIG. 6.

Another embodiment of the pressure sensor 300 is depicted in FIGS. 6 and 7. The pressure sensor 300 includes a housing 310 that includes an interior surface 312 and an axially symmetric liner 330 disposed along the interior surface 312 of the housing 310, where the liner 330 has an interior surface 332 and an exterior surface 334. The pressure sensor 300 further includes a sensing member 320 comprising an interior surface 322 and an exterior surface 324, where the interior surface 322 of the sensing member 320 is adjacent to the exterior surface 334 of the liner 330. A strain gauge 140 is affixed to the exterior surface 324 of the sensing member 320.

In this embodiment, the sensing member 320 is a sensing ring that surrounds the exterior surface 334 of the liner 330. Because the sensing member 320 completely surrounds the liner 330, an increase in pressure of a fluid flowing through the liner 330 causes the liner 330 to expand, which, in turn, causes the sensing member 320 to expand. The sensing member 320 is at least partially detached from the housing 310 such that the housing 310 does not affect the strain imparted on the sensing member 320 as to allow for a more accurate measurement of strain and, therefore, pressure of a fluid inside the liner 130. The sensing member 320 may be attached to the housing 310 in at least one location to prevent the sensing member 320 from moving relative to the housing 310 and the liner 330. As depicted in FIG. 7, the sensing member 320 is attached to the housing 310 at a location approximately 90° away from the location of the strain gauge 140 as to minimize any influence the housing 310 would have on the measurement of strain at the sensing member 320.

Because the sensing member 320 is completely detached from the housing 310 along one side of the sensing member 320, the housing 310 itself cannot resist force along the axial direction of the liner 330. Consequently, the liner 330 has a wall thickness greater than about 3 millimeters to resist force in the axial direction of the liner 330 and any force in directions perpendicular to the axial direction of the liner 330.

Figure 8:
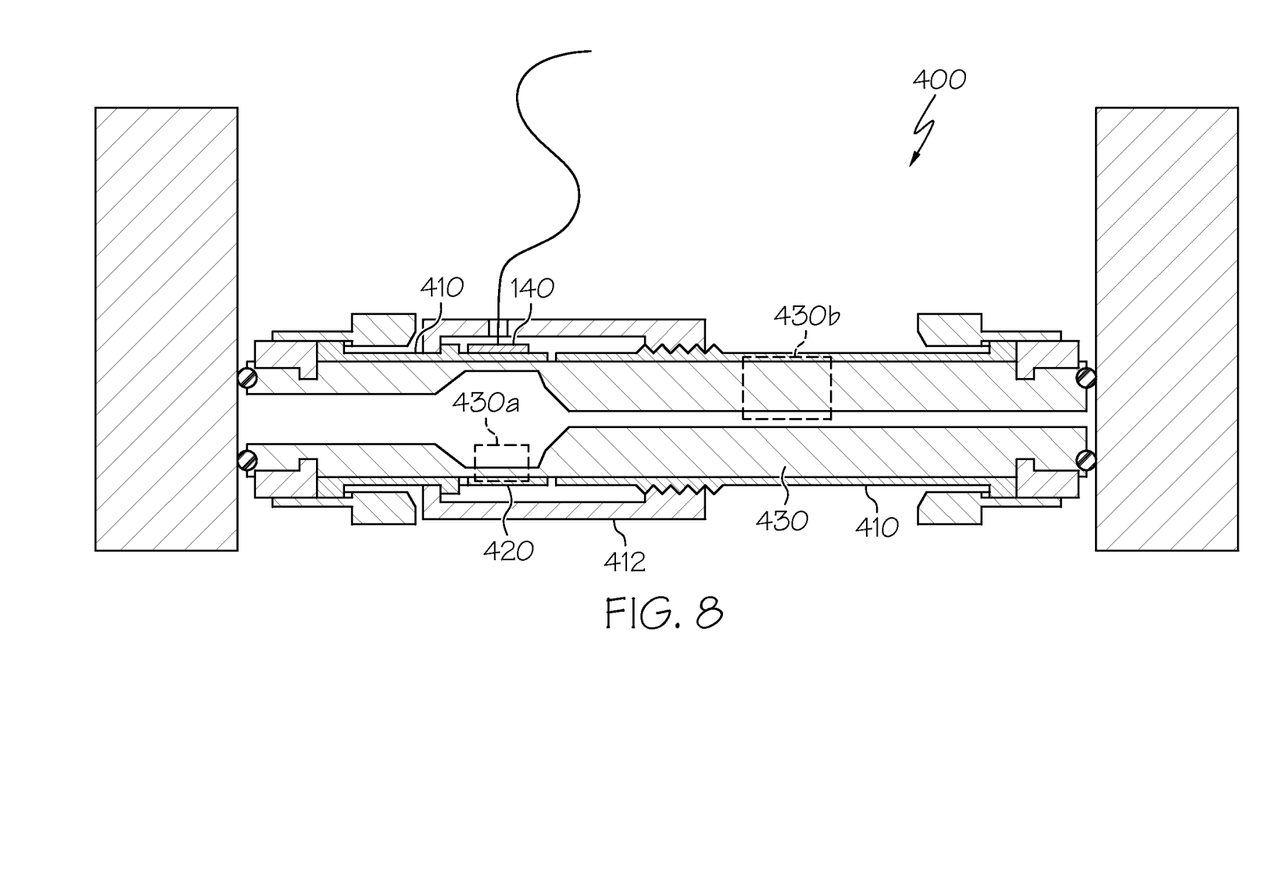
FIG. 8 depicts a section view of an in-line pressure sensor according to one or more embodiments shown and described herein.

Another embodiment of the pressure sensor 400 is depicted in FIG. 8. A retention collar 412 is included with the pressure sensor 400, which couples both ends of the housing 410 relative to one another and acts to resist force in the axial direction of the liner 430. As depicted in FIG. 8, the retention collar 412 mechanically engages both the upstream and the downstream section of the housing 410 by through an interference fit with the downstream section and a threaded attachment with the upstream section. The retention collar 412 prevents the upstream and the downstream sections of the housing 410 from moving axially or radially relative to one another when a fluid is introduced into the liner 430. Because the liner 430 does not have to resist force along its axial direction, the liner 430 can be thinner than the liner 330 depicted in FIG. 7. For example, the liner 430 depicted in FIG. 8 may have a wall thickness as thin as about 0.025 millimeters. The liner 430 may also be formed such that the wall thickness varies over the length of the liner 430. The thinner section 430*a* of the liner 430 may be placed near the sensing member 420 because the thinner section 430*a* may make the strain gauge 140 more sensitive to pressure variation as compared to the thicker section 430*b* due to the increased stiffness associated with the thicker section 430*b*. The reduction in stiffness of the thinner section 430*a* reduces the amount of pressure that can be absorbed by the liner 430 on its own. Thus, a greater proportion of the pressure of the fluid is absorbed by the sensing member 420, rather than the liner 430, as compared to a pressure sensor that has a thicker liner.

Additionally, because the thinner section 430*a* is associated with a reduced stiffness, there may be less effect on the expansion of the sensing member 420 due to temperature fluctuations. The chemically inert materials listed above from which the liners are constructed generally have a greater coefficient of thermal expansion than the materials from which the sensing members 420 are constructed. Because of this, the liner 430 will expand more than the sensing member 420 given the same increase in temperature. The difference in expansion between the liner 430 and the sensing member 420 may be exacerbated because the liner 430 is constructed of a thermally insulating material. This difference in expansion may induce strain in the sensing member 420 due to the thermal expansion of the liner 430. However, in the embodiment of FIG. 8, because the liner 430 is relatively thin and therefore flexible in the circumferential direction, the amount of force that the liner 430 can impart on the sensing member 420 due to thermal expansion is small. Therefore, error in the measurement of pressure of the fluid due to the difference in the coefficient of thermal expansion of the liner 430 and the sensing member 420 is smaller for liners having thinner sections as compared with liners having thicker sections.

Figure 9:
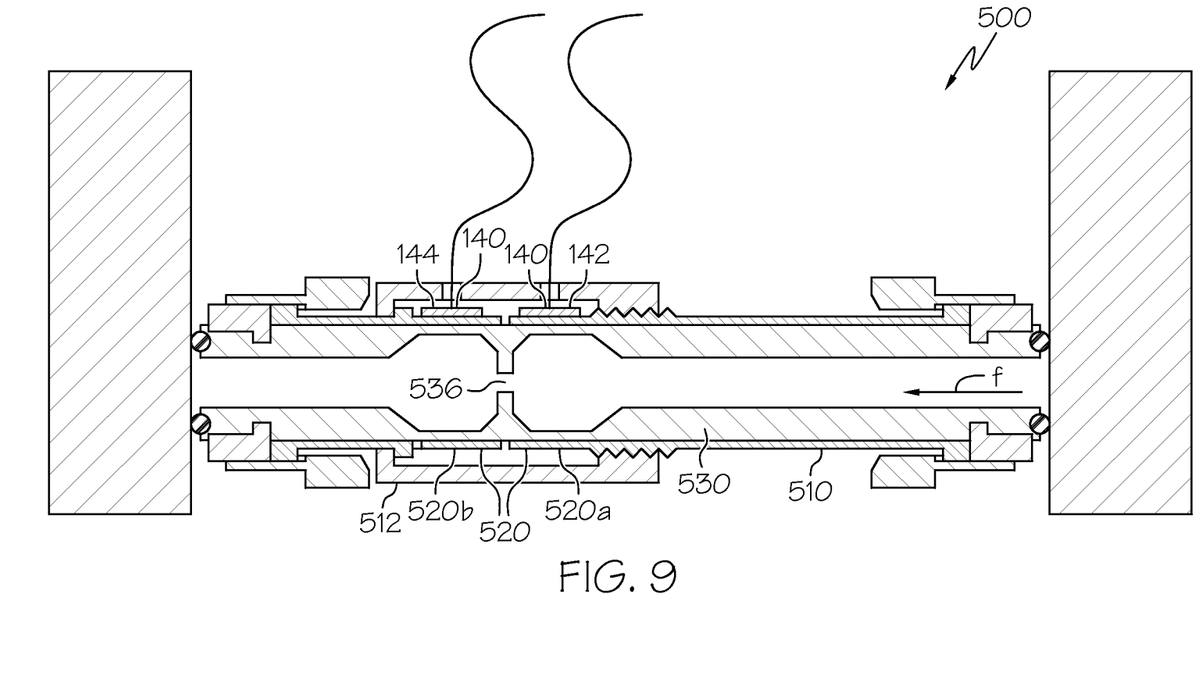
FIG. 9 depicts a section view of an in-line pressure sensor according to one or more embodiments shown and described herein.

Another embodiment of the pressure sensor 500 is depicted in FIG. 9. Similar to the embodiment depicted in FIG. 5, this embodiment includes an orifice 536 along the fluid flow path of the liner 530, two sensing members 520, an upstream sensing member 520a and a downstream sensing member 520b, that are spaced apart from one another along the direction of fluid flow f. The pressure sensor 500 may be used to measure the flow rate of a fluid that passes through the orifice 536 by measuring the pressure of the fluid at a location upstream of the orifice 536 and downstream of the orifice 536. The measurements of strain of the upstream sensing member 520a and the downstream sensing member 520b are measured by strain gauges 140, specifically the upstream strain gauge 142 and the downstream strain gauge 144, respectively.

The pressure sensor 500 includes a retention collar 512 that couples either end of the housing 510 to one another in the axial direction of the liner 530. As can be seen in FIG. 9, the upstream sensing member 520a and the downstream sensing member 520b are completely separated from one another in the axial direction, and therefore the housing 510 cannot resist force in the axial direction of the liner 530 or in directions perpendicular to this axial direction.

The embodiment depicted in FIG. 9 includes sensing rings as the upstream sensing member 520a and the downstream sensing member 520b. Both sensing members 520a, 520b are both at least partially detached from the housing 510 so as to minimize any influence that the housing 510 may have on the measurements of strain in the sensing members 520a, 520b, and therefore the calculation of pressure and flow rate of the fluid flowing through the liner 530.

Additionally, the liner 530 is thinned locally in locations corresponding to the sensing members 520a, 520b. The transitions between thin and thick sections of the liner 530 may be shaped such that the fluid flowing through the liner 530 is fully developed before the fluid reaches the orifice 536 (i.e., the velocity profile of the fluid is constant). The calculation of fluid flow rate is generally more accurate for a fluid flow that is fully developed before it reaches the orifice 536 than fluid flow that is not fully developed.

The previously described pressure sensors allow for the use of chemically inert liners that do not react with chemical reactants introduced into the liners. The liners are axially symmetric, which minimizes any amount of entrapped volumes inside the liners, which improves the ability to clean leftover chemical reactants from the pressure sensors. The pressure sensors are configured to monitor and measure the magnitude of the pressure of a fluid passing through the liner.

It is noted that the terms "substantially," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydro formylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

While particular embodiments have been illustrated and described herein, it should be understood that various other changes and modifications may be made without departing from the spirit and scope of the claimed subject mater. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pressure sensor comprising:
   a liner having an axis of symmetry oriented along a fluid flow path of the liner and a circumference around the axis of symmetry, the liner comprising an interior surface and an exterior surface;
   a housing comprising an interior surface facing the fluid flow path;
   a sensing member comprising an interior surface facing the fluid flow path and an exterior surface, wherein the interior surface of the sensing member alone, or together with the interior surface of the housing, forms an enclosed channel that is in contact with the exterior surface of the liner and surrounds the liner circumferentially, and the sensing member is configured to expand with the liner in a direction along the circumference of the liner; and
   a strain gauge affixed to the exterior surface of the sensing member.

2. The pressure sensor of claim 1, wherein the liner comprises a chemically inert material.

3. The pressure sensor of claim 2, wherein the chemically inert material comprises polytetrafluoroethylene.

4. The pressure sensor of claim 1, wherein the sensing member comprises a ferrous alloy.

5. The pressure sensor of claim 1, wherein the sensing member comprises a stainless steel alloy.

6. The pressure sensor of claim 1, wherein the housing comprises a ferrous alloy.

7. The pressure sensor of claim 1, wherein the sensing member comprises a sensing ring that surrounds the exterior surface of the liner.

8. The pressure sensor of claim 1, wherein the sensing member comprises a curved metal sheet that at least partially surrounds the exterior surface of the liner.

9. The pressure sensor of claim 8, wherein the curved metal sheet is secured to the housing with a plurality of fasteners.

10. The pressure sensor of claim 1, wherein the pressure sensor measures a magnitude of a pressure of a fluid inside the liner.

11. The pressure sensor of claim 1, further comprising:
a downstream sensing member spaced from the sensing member and comprising an interior surface and an exterior surface, wherein the interior surface of the downstream sensing member is in contact with the exterior surface of the liner, and
a downstream strain gauge is affixed to the exterior surface of the downstream sensing member, wherein the interior surface of the liner comprises an orifice that is defined by a smallest internal diameter of the liner along a path of fluid flow, wherein the orifice is disposed between the sensing member and the downstream sensing member along the path of fluid flow.

12. The pressure sensor of claim 1 wherein the liner is sufficiently thin to expand in a circumferential direction in response to pressure within the fluid path and is positioned between the fluid flow path and the housing whereby fluids in the fluid flow path are prevented from coming into contact with the housing and between the fluid flow path and the sensing member whereby fluids in the fluid flow path are prevented from coming into contact with the sensing member.

13. A method of measuring a pressure of a fluid comprising:
passing the fluid through a pressure sensor comprising:
a liner having an axis of symmetry oriented along a fluid flow path of the liner and a circumference around the axis of symmetry, the liner comprising an interior surface and an exterior surface,
a housing comprising an interior surface facing the fluid flow path, and
a sensing member comprising an interior surface facing the fluid flow path and an exterior surface, wherein the interior surface of the sensing member alone, or together with the interior surface of the housing, forms an enclosed channel that is in contact with the exterior surface of the liner and surrounds the liner circumferentially, and a strain gauge affixed to the exterior surface of the sensing member; and
evaluating a magnitude of the pressure of the fluid inside the liner based on the extension of the strain gauge.

14. The method of claim 13, wherein the liner of the pressure sensor comprises a chemically inert material.

15. A fluid flow meter comprising:
a liner having an axis of symmetry oriented along a fluid flow path of the liner and a circumference around the axis of symmetry, wherein the liner comprises an interior surface, an exterior surface, and an orifice, wherein the orifice is defined by a smallest internal diameter of the liner along a path of fluid flow;
a housing comprising an interior surface facing the fluid flow path;
an upstream sensing member comprising an interior surface facing the fluid flow path and an exterior surface, wherein the interior surface of the upstream sensing member alone, or together with the interior surface of the housing forms an enclosed channel that is in contact with the exterior surface of the liner and surrounds the liner circumferentially, and is configured to expand with the liner in a direction along the circumference of the liner and wherein the upstream sensing member is located on an upstream side of the orifice;
a downstream sensing member comprising an interior surface facing the fluid flow path and an exterior surface, where the interior surface of the downstream sensing member alone, or together with the interior surface of the housing forms an enclosed channel that is in contact with the exterior surface of the liner and surrounds the liner circumferentially, and is configured to expand with the liner in a direction along the circumference of the liner and wherein the downstream sensing member is located on a downstream side of the orifice;
an upstream strain gauge affixed to the exterior surface of the upstream sensing member; and
a downstream strain gauge affixed to the exterior surface of the downstream sensing member.

16. The fluid flow meter of claim 15, wherein the liner comprises a chemically inert material.

17. The fluid flow meter of claim 15, wherein the orifice comprises a square-edged orifice.

18. The fluid flow meter of claim 15, wherein the orifice comprises a sharp-edged orifice.

19. The fluid flow meter of claim 15, wherein the upstream sensing member comprises a sensing ring that surrounds the exterior surface of the liner.

20. The fluid flow meter of claim 15, wherein the upstream sensing member comprises a curved metal sheet that at least partially surrounds the exterior surface of the liner.

* * * * *